US006534126B1

(12) United States Patent
Blackwood et al.

(10) Patent No.: US 6,534,126 B1
(45) Date of Patent: Mar. 18, 2003

(54) COATINGS FOR POLYMERIC SUBSTRATES

(75) Inventors: William Raye Blackwood, Midland, MI (US); James Habermehl, Midland, MI (US); Donald Taylor Liles, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/709,111

(22) Filed: Nov. 13, 2000

(51) Int. Cl.$^7$ ............................. B05D 1/36; B05D 7/24
(52) U.S. Cl. ................... 427/407.1; 427/180; 427/204; 427/387; 427/391; 427/411; 427/412; 427/412.2; 427/412.5
(58) Field of Search ............................... 427/180, 204, 427/387, 391, 407.1, 411, 412, 412.2, 412.5; 162/135

(56) References Cited

U.S. PATENT DOCUMENTS

| | | | |
|---|---|---|---|
| 4,594,134 A | 6/1986 | Hanada et al. | 522/99 |
| 4,985,277 A * | 1/1991 | Shimizu et al. | 427/180 |
| 5,208,097 A * | 5/1993 | Honma et al. | 428/266 |
| 5,258,211 A * | 11/1993 | Momii et al. | 428/35.2 |
| 5,708,057 A | 1/1998 | Morita et al. | 523/402 |
| 5,789,084 A | 8/1998 | Nakamura et al. | 428/447 |
| 5,871,761 A | 2/1999 | Kuwata et al. | 424/401 |
| 5,877,256 A | 3/1999 | Nakamura et al. | 524/765 |
| 5,928,660 A | 7/1999 | Kobayashi et al. | 424/401 |
| 6,267,842 B1 * | 7/2001 | Ona et al. | 162/135 |

FOREIGN PATENT DOCUMENTS

EP  0989226 A2  3/2000  ........ D06M/15/643

OTHER PUBLICATIONS

Polymer Preprints 2001, 42(1),xxxx, Silicone Elastomeric Powders (Unpublished at Time of Filing Application).

* cited by examiner

Primary Examiner—Shrive P. Beck
Assistant Examiner—Elena Tsoy
(74) Attorney, Agent, or Firm—Jim L. DeCesare; Catherine U. Brown

(57) ABSTRACT

The tack of a polymeric substrate is reduced by (i) coating a surface of the polymeric substrate with a thermosetting liquid silicone rubber composition, (ii) applying an aqueous suspension of powdered silicone rubber with a mean particle size of 0.1 to 500 micron to the coating of thermosetting liquid silicone rubber composition on the polymeric substrate, and (iii) heating the coated polymeric substrate to cure the thermosetting liquid silicone rubber composition and simultaneously adhere the powdered silicone rubber to the coating on the polymeric substrate.

4 Claims, No Drawings

COATINGS FOR POLYMERIC SUBSTRATES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to coatings for polymeric substrates, and in particular, the invention is directed to the application of an aqueous suspension of powdered silicone rubber to substrates useful in the manufacture of air bags for automobiles.

BACKGROUND OF THE INVENTION

U.S. Pat. No. 4,594,134 (Jun. 10, 1986) teaches the use of powdered silicone rubber as a coating for various substrates including posters, butyl rubber, polyamides such as Nylon-6,6, and asphalt. The purpose of the coating is to remove surface tack of the substrate. However, the powdered silicone rubber in the '134 patent is applied to the polymeric substrate as a dry powder, rather than as an aqueous suspension, and therefore surface coverage obtained in the '134 patent is not uniformly consistent.

While application of aqueous dispersions of powdered silicone rubber to polymeric substrates such as silicone gel sheets is known in U.S. Pat. No. 4,985,277 (Jan. 15, 1991), the surface of the silicone gel sheet to which the aqueous dispersion is applied is cured rather than uncured. Therefore adherence of powdered silicone rubber to these substrates is difficult to maintain.

These disadvantages are overcome according to this invention by applying an aqueous suspension of powdered silicone rubber to polymeric substrates, especially polymeric substrates which have been pre-treated with a thermosetting liquid silicone rubber composition, and more particularly to polymeric substrates used as base fabrics in the manufacture of automobile air bags.

BRIEF SUMMARY OF THE INVENTION

The invention therefore relates to a process for modifying the surfaces of polymer coated base fabrics used in the fabrication of coated articles such as automotive airbags, inflatable curtains, latex products, and other such inflatable devices, wherein the coefficient of friction needs to be minimized.

In particular, the invention consists of treating polymer coated base fabrics with an aqueous suspension of powdered silicone rubber which reduces the coefficient of friction, i.e., the tack, and renders the coated base fabric resistant to blocking.

The polymer coated base fabric may be treated with the powdered silicone rubber by a variety of techniques, some examples of which are electrostatic spraying, atomization of a solvent dispersion, atomization of an aqueous suspension, and by mechanical means such as buffing.

The resulting powdered silicone rubber modified and coated base fabric has been found to possesses a unique tack-free and slippery feel which has a low coefficient of friction, all of which properties are desirable attributes.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

As the development and manufacture of airbags for automotive use expands, thermosetting liquid silicone rubber compositions have become one of the materials of choice for coating the newer generation of airbags. However, some of these thermosetting liquid silicone rubber compositions exhibit a very high coefficient of friction, and therefore their application to the base fabric of the air bag results in a tendency of the base fabric layers to block, i.e., the layers tend to stick to one another when folded or overlapped. As a result, it is often necessary to apply a second coating of the thermosetting liquid silicone rubber composition to the base fabric layer in order to eliminate this undesirable blocking tendency.

Such thermosetting liquid silicone rubber compositions for application to base fabrics used in air bags for automobiles are well known, and reference may be had, for example, to U.S. Pat. No. 5,208,097 (May 4, 1993), U.S. Pat. No. 5,789,084 (Aug. 4, 1998), and U.S. Pat. No. 5,877,256 (Mar. 2, 1999). These thermosetting liquid silicone rubber compositions are typically applied to base fabrics comprised of polyamide fiber or polyester fiber, and then heat treated to harden or cure the coating on the base fabric. Generally, the thermosetting liquid silicone rubber compositions consist of an organopolysiloxane containing an alkenyl group, an organopolysiloxane containing a hydrogen atom, an organopolysiloxane containing an epoxy group, a suitable filler, and a hydrosilation type catalyst.

While these types of thermosetting liquid silicone rubber compositions have been a success in the market place, their residual tack after being cured impairs processing of base fabrics for air bags during finishing operations such as sewing. During these finishing operations, the tackiness often causes adjacent layers of treated base fabric to stick together when the coated layers are folded and stored. Powders such as talc, calcium carbonate, and clay, have been used for dusting the layers, and while such powders can temporarily alleviate their tackiness, such powders can easily be removed from the layers which interferes with the sewing and handling operations. In addition, powders of this type generate an excess of airborne dust in the workplace which can be an environmental concern.

In an effort to overcome these disadvantages, the improvement according to this invention relates to the use of an aqueous suspension of powdered silicone rubber for modifying such treated polymeric substrates. The preferred method of application is to spray an aqueous suspension of the powdered silicone rubber onto uncured surfaces of the treated polymeric substrate. Preferably, the treated surface of the polymeric substrate to which the aqueous suspension of powdered silicone rubber is applied should be a treated surface that does not contain water.

The treated substrate is then heated to cure the thermosetting liquid silicone rubber composition, which simultaneously promotes adherence of the powdered silicone rubber particles on the surface of the treated polymeric substrate. It has been determined that the presence of the powdered silicone rubber particles on the surface of the cured polymeric substrate does not interfere with the adhesion properties of the thermosetting liquid silicone rubber coating composition to the base fabric of the air bag.

The process according to the invention allows one to apply a coefficient of friction reducing topcoat to a coated polymeric substrate without initially having to cure the surface of the coated polymeric substrate. This reduces processing time of coating operations and generally improves the durability of topcoats on polymeric substrates.

The application of relatively small amounts of powdered silicone rubber to coated airbag base fabric layers lowers their coefficient of friction and reduces their tendency to block. For example, as little as about two gram/square meter of powdered silicone rubber applied to surfaces of an air bag base fabric layer which has been treated with a thermosetting liquid silicone rubber composition, can lower its coefficient of friction by factors of almost five.

While the powdered silicone rubber can be applied to coated airbag base fabric layers by buffing on the powdered silicone rubber by hand, the preferred method of applying the powdered silicone rubber is by spraying it as an aqueous based emulsion, suspension, or dispersion.

Hand application of powdered silicone rubber generally consists of dusting base fabric layers with the powdered silicone rubber, and then rubbing the powdered silicone rubber on the surface of the base fabric layer manually.

Other methods of applying powdered silicone rubber include electrostatic spraying of the type commonly practiced in the powder coating arts, and by spraying atomized mists of powdered silicone rubber suspensions as solvent or water based compositions. As noted above, application as an aqueous suspension is the most preferred method.

Although the powdered silicone rubber is primarily intended for modifying the surface of fabrics coated with a thermosetting liquid silicone rubber composition, it is useful for modifying the surface of fabric layers coated with other types of polymers. Reference may be had, for example, to U.S. Pat. No. 4,594,134 (Jun. 10, 1986) for a detailed list of some substrates which can be treated, among which are natural rubber, polychloroprene rubber, polyurethane rubber, polyethylene terephthalate, polycarbonate, polystyrene, polyethylene, polypropylene, polyvinyl chloride, polyvinyl acetate, polyethylene glycol, phenolic resins, acrylic resins, and cellulose based polymers.

Aqueous suspensions of powdered silicone rubber suitable for use herein are compositions known in the art, and they are commercially available from sources such as the Dow Corning Corporation, Midland, Mich., and Dow Corning Toray Silicone Co., Ltd., Tokyo, Japan. Such aqueous suspensions of powdered silicone rubber are also described in detail in a number of patents, among which are U.S. Pat. No. 5,708,057 (Jan. 13, 1998), U.S. Pat. No. 5,871,761 (Feb. 16, 1999), U.S. Pat. No. 5,928,660 (Jul. 27, 1999), and European Patent Application EP 0 989 226 A2 (Mar. 28, 2000).

These aqueous suspensions of powdered silicone rubber typically comprise suspensions obtained, for example, by curing an addition reaction curable silicone rubber composition, a condensation reaction curable silicone rubber composition, an organic peroxide curable silicone rubber composition, or an ultraviolet radiation curable silicone rubber composition, in a state in which the composition is dispersed in water in the form of fine particles. Examples of addition reaction curable silicone rubber compositions include compositions consisting of at least an organopolysiloxane which has at least two alkenyl groups per molecule, an organopolysiloxane which has at least two hydrogen atoms bonded to silicon atoms in each molecule, and a platinum type catalyst. Examples of condensation reaction curable silicone rubber compositions consist of at least an organopolysiloxane which has at least two hydroxy groups or hydrolyzable groups such as alkoxy groups, oxime groups, acetoxy groups, or aminoxy groups, bonded to silicon atoms in each molecule, a silane cross-linking agent which has at least three hydrolyzable groups such as alkoxy groups, oxime groups, acetoxy groups, or aminoxy groups, bonded to silicon atoms in each molecule, and a condensation reaction catalyst such as an organo-tin or an organo-titanium compound.

In order to achieve stable dispersions of these curable silicone rubber compositions as fine particles in water, it is desirable to use one or more nonionic surfactants, cationic surfactants, and/or anionic surfactants. The amount of surfactant used is generally in the range of 0.1–20 parts by weight, preferably 0.5–10 parts by weight, per 100 parts by weight of the curable silicone rubber composition.

The mean particle size of the powdered silicone rubber in the aqueous suspension is in the range of 0.1–500 micron, and preferably in the range of 0.5–50 micron. The shape of the powdered silicone rubber particles may be spherical, flat, or amorphous, but spherical particles are generally preferred. Furthermore, it is desirable that the hardness of the powdered silicone rubber be 80 or less, as determined by Japanese Industrial Standard (JIS) A hardness test procedures, and a JIS A hardness of 65 or less is most preferred.

While there are no particular limitations on the content of powdered silicone rubber in the aqueous suspension, it is preferred that the powdered silicone rubber be present in the aqueous suspension in a range of about 10–80 percent by weight based on total weight of the aqueous suspension.

Reference may be had to Practical Example 3 in U.S. Pat. No. 5,928,660 (Jul. 27, 1999) for a detailed procedure for making aqueous suspensions of powdered silicone rubber suitable for use according to the present invention, and to Reference Example 1 of the '660 patent for the procedure of making a dry powdered silicone rubber from the aqueous suspension.

EXAMPLES

The following examples are set forth in order to illustrate this invention in more detail.

Example 1

A rectangular portion of an inflatable curtain measuring 73.7 cm×35.6 cm was placed flat on a paper sheet lying on a bench top. The inflatable curtain was manufactured using the Jacquard weaving process from a fabric of polyamide 6,6-nylon fiber having 144 filaments per fiber. The inflatable curtain fabric was coated on one side with a thermosetting liquid silicone rubber composition at a loading of 130 gram/square meter. Using a spatula, 0.72 g of spherical powdered silicone rubber having particles with an average size of about 5 micron in diameter was sprinkled on top of the coated inflatable curtain fabric, and the powdered silicone rubber was rubbed onto the entire surface by hand for 1–2 minutes. The white powdered silicone rubber was visible before rubbing it onto the coated inflatable curtain fabric, but after rubbing, it became invisible. By weighing the coated inflatable curtain fabric before and after treatment on an analytical balance, it was determined that the weight of the coated inflatable curtain fabric increased by 0.52 gram. This is equivalent to a loading of approximately 2 gram of powdered silicone rubber per square meter of the coated inflatable curtain fabric. The coefficient of friction (COF) of the powdered silicone rubber modified coated inflatable curtain fabric was determined using a standard TMI COF testing device. This device included a 200 gram B type sled with 8.5 inch sample strips. The COF value was found to be 0.472 static and 0.468 kinetic. Using the same procedure, the COF of a sample of coated but unmodified inflatable curtain fabric was 2.30 static and 2.1 kinetic. This difference in COF indicates that a significant decrease in tack can be obtained using powdered silicone rubber, i.e., an almost five fold reduction.

Example 2

A rectangular portion of an inflatable curtain measuring 43 cm×33 cm was coated with a thermosetting liquid silicone rubber composition at a coating weight of 130 grams per square meter using a Mathis Werner Type SV laboratory coating device. The coated surface area was 28 cm×30 cm with an average coating weight of 130 gram/square meter. This was determined by measuring the weight of the coated fabric and noting the difference from the weight of the uncoated fabric. The inflatable curtain was manufactured using the standard Jacquard weaving process from a fabric of polyamide 6,6-nylon fiber. The fabric was reported by the manufacturer as having 144 filaments per fiber, a fiber strength of 470 detex, and a basis weight of 460 grams per square meter. The uncured coating of the thermosetting liquid silicone rubber composition was then sprayed with an aqueous suspension of powdered silicone rubber having particles with an average size of 5 micron in diameter at an average coating weight of 5–9 gram/square meter. This application was carried out with a Kremlin M18/2 Air Spray gun equipped with a pressure feed cup, a nitrogen air cap, a type 215 nozzle with a three pound per square inch cup delivered at 35–60 pounds per square inch of air pressure. Weighing the inflatable curtain fabric before and after treatment with an analytical balance indicated that the weight of the inflatable curtain fabric increased by 9 gram/square meter.

The coefficient of friction of the powdered silicone rubber modified coated inflatable curtain fabric was determined using the standard TMI COF testing device model number 32-06. The device had 200 gram type B sled and 8.5 inch sample strips. The COF value was found to be 0.485 static and 0.454 kinetic. Using the same procedure, the COF for a sample of coated but unmodified inflatable curtain fabric was 2.30 static and 2.1 kinetic. Again, the decrease in tack using powdered silicone rubber was an almost five fold reduction.

The durability of powdered silicone rubber particles cured onto the surface of the coated inflatable curtain fabric using the above method of application was determined using the Moonweave Scrub Test. This is a standard adhesion test protocol of the International organization for Standardization (ISO), Geneva, Switzerland. The protocol is ISO 5981:1997 entitled *Rubber or Plastic Coated Fabrics—Determination of Resistance to Combined Shear Flexing & Rubbing*. According the ISO test protocol, 5 cm×10 cm coated samples from curtain sections of fabric are used in the test procedure. Typical scrubs for fabric coated with 130 grams per square meter of a polyorganosiloxane based polymer are 3,000 to 3,500 scrub cycles unaged, and 1,000 to 1,500 scrub cycles after heat aging at 125° C. for 336 hours. The scrubs of coated material with a topcoat from this example yielded 4,500 scrub cycles unaged, and 2,500 to 3,000 cycles after aging. After aging, the coated material did not block, and it retained COF measurements of 0.585 static and 0.560 kinetic.

Example 3

A rectangular portion of cellulose gypsum board cover measuring 8.5×11 inches was coated with an aqueous suspension of powdered silicone rubber having particles of an average size of 5 micron in diameter using a draw down laboratory coating bar, and then dried to evaporate water. The coated surface area of the cellulose gypsum board cover was 8.5×11 inches with an average coating weight of 3 gram/square meter. This was determined by measuring the weight of the coated cellulose gypsum board cover and noting the difference from the basis weight of the uncoated cellulose gypsum board cover.

The coefficient of friction of the powdered silicone rubber coated cellulose gypsum board cover substrate was determined using the standard TMI COF testing device model number 32-06 having a 200 gram type B sled with 8.5 inch sample strips. The COF value was found to be 0.325 static and 0.309 kinetic. Using the same procedure, the COF for a sample of coated but unmodified cellulose gypsum board cover was 0.90 static and 0.89 kinetic. The decrease in tack using powdered silicone rubber was an almost three fold reduction.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of reducing the tack of a polymeric substrate comprising (i) coating a surface of the polymeric substrate with an uncured thermosetting liquid silicone rubber composition, (ii) applying an aqueous suspension of powdered silicone rubber with a mean particle size of 0.1–500 micron to the coating of the uncured thermosetting liquid silicone rubber composition on the polymeric substrate, and (iii) heating the coated polymeric substrate to cure the uncured thermosetting liquid silicone rubber composition and to simultaneously evaporate water and adhere the particles of powdered silicone rubber to the cured coating of thermosetting liquid silicone rubber composition on the polymeric substrate.

2. The method according to claim 1 in which the aqueous suspension of powdered silicone rubber is a composition obtained by curing a curable silicone rubber composition dispersed in water in the form of fine particles, the curable silicone rubber composition being an addition reaction curable silicone rubber composition, a condensation reaction curable silicone rubber composition, an organic peroxide curable silicone rubber composition, or an ultraviolet radiation curable silicone rubber composition.

3. The method according to claim 1 in which the thermosetting liquid silicone rubber composition comprises an organopolysiloxane containing an alkenyl group, an organopolysiloxane containing a hydrogen atom, an organopolysiloxane containing an epoxy group, a filler, and a catalyst.

4. The method according to claim 1 in which the polymeric substrate is a fabric of polyamide fiber or polyester fiber.

* * * * *